United States Patent
Backman et al.

(10) Patent No.: US 8,731,497 B2
(45) Date of Patent: May 20, 2014

(54) METHOD AND ARRANGEMENT IN A COMMUNICATION SYSTEM

(75) Inventors: Ulf Backman, Hägersten (SE); Jacob Osterling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 275 days.

(21) Appl. No.: 13/145,345

(22) PCT Filed: Feb. 18, 2009

(86) PCT No.: PCT/SE2009/050173
§ 371 (c)(1),
(2), (4) Date: Jul. 20, 2011

(87) PCT Pub. No.: WO2010/095985
PCT Pub. Date: Aug. 26, 2010

(65) Prior Publication Data
US 2011/0275405 A1 Nov. 10, 2011

(51) Int. Cl.
*H01Q 11/12* (2006.01)

(52) U.S. Cl.
USPC ............ 455/127.1; 455/561; 455/562.1

(58) Field of Classification Search
USPC ...................................................... 455/127.1
See application file for complete search history.

(56) References Cited

U.S. PATENT DOCUMENTS

| 7,167,718 | B2 | 1/2007 | Hayashi et al. | |
| 2004/0014500 | A1* | 1/2004 | Chun | 455/561 |
| 2006/0040624 | A1* | 2/2006 | Lipka | 455/114.3 |

FOREIGN PATENT DOCUMENTS

| CN | 101 056 129 | 10/2007 |
| EP | 1 605 605 | 12/2005 |
| EP | 2 075 923 | 7/2009 |
| JP | 2001-519635 | 10/2001 |
| JP | 2002-217828 | 8/2002 |
| JP | 2009-033270 | 2/2009 |
| WO | 99/18744 | 4/1999 |
| WO | WO 99/18744 | 4/1999 |
| WO | WO 2004/057758 | 7/2004 |

OTHER PUBLICATIONS

Japanese Office Action issued in Application No. 2001-551032 dated Jan. 22, 2013.
International Search Report for PCT/SE2009/050173, mailed Nov. 16, 2009.
Written Opinion for PCT/SE2009/050173, mailed Nov. 16, 2009.
Japanese Office Action issued in Application No. 2001-551032 dated Apr. 23, 2013.

* cited by examiner

*Primary Examiner* — Ajibola Akinyemi
(74) *Attorney, Agent, or Firm* — Nixon & Vanderhye, P.C.

(57) ABSTRACT

Method and arrangement in a first carrier controller, associated with a network node. The method aims at providing distributed power management of a plurality of power amplifiers within a sector. The first carrier controller, the network node and the power amplifiers are comprised within a communication system. Also, at least one further carrier controller is comprised within the communication system. The first carrier controller is arranged for scheduling power allocation at each power amplifier of the radio frequency power estimated to be used by at least one carrier controlled by the first carrier controller. The method comprises allocating the estimated power usage to be used by the at least one carrier controlled by the first carrier controller during a predetermined time frame on one or more power amplifiers within the same sector. The allocation is based on a priority value of each carrier, dedicated to that sector or to a power amplifier within that sector.

11 Claims, 8 Drawing Sheets

| | Power | Expiration time | Priority | MCPA / Sector | Power | Expiration time | Priority | MCPA / Sector | ... | Power | Expiration time | Priority | MCPA / Sector |
|---|---|---|---|---|---|---|---|---|---|---|---|---|---|
| Carrier 1 | | | | | | | | | | | | | |
| Carrier 2 | | | | | | | | | | | | | |
| Carrier 3 | | | | | | | | | | | | | |
| ... | | | | | | | | | | | | | |
| Carrier n | | | | | | | | | | | | | |

Group corresponding to one time increment.

Number of time increments is determined by the scheduling horizon of the carrier controller with longest time increment.

METHOD AND ARRANGEMENT IN A COMMUNICATION SYSTEM

This application is the U.S. national phase of International Application No. PCT/SE2009/050173 filed 18 Feb. 2009 which designated the U.S., the entire content of which is hereby incorporated by reference.

TECHNICAL FIELD

The present invention relates to a method and arrangement in a communication system and, more in particular, to a mechanism for distributed power management.

BACKGROUND

The evolution of broad band wireless services such as Wideband Code Division Multiple Access (WCDMA) and Long Time Evolution (LTE) has improved the performance of high linear wide band power amplifiers, normally called Multi Carrier Power Amplifiers (MCPA). The MCPA may also be used to amplify combined multiple narrow band carriers signals, such as multiple Global System for Mobile communications (GSM) carriers. The use of MCPA for GSM thus removes the need for high power radio frequency combiners.

The use of MCPA for GSM, WCDMA, LTE or other cellular radio systems requires that the allocation of radio frequency power is divided among the carrier controllers of the same MCPA. The allocation of power has to be performed in accordance with a common cell planning.

A problem with MCPA is to maintain the input signal within the linear range of the power amplifier. In a legacy broad band wireless system, the input signal is normally controlled by a single controlling entity, ensuring operation to be within range. In a GSM system with multiple GSM carriers, each with its own corresponding controlling entity, a coordination of the input signal strengths is required.

The MCPA may also be used to amplify the combined signal of carriers of different standards, such as the combination of two GSM carriers and one WCDMA carrier. A coordination of the input signal is then again required. The present invention relates to the coordination of signal strength between controlling entities, or carrier controllers, of the same or different standards.

Thus the user plane data is managed by a carrier controller. The carrier controller is a control function which, amongst other, controls the output power to be used by the carrier it controls. In this context, the carrier may be a portion of the air interface carrier as defined by the relevant standard such as e.g. 3GPP etc, the portion being characterized by having a certain traffic type and/or priority. The carrier controller may also operate on a plurality of carriers.

Each carrier controller may allocate as much radio frequency power from the MCPA as assigned, but not more. If an over-allocation occurs, the MCPA will limit the transmitted signal in some way and transmitted information will get lost or has to be re-transmitted.

Figure 1:
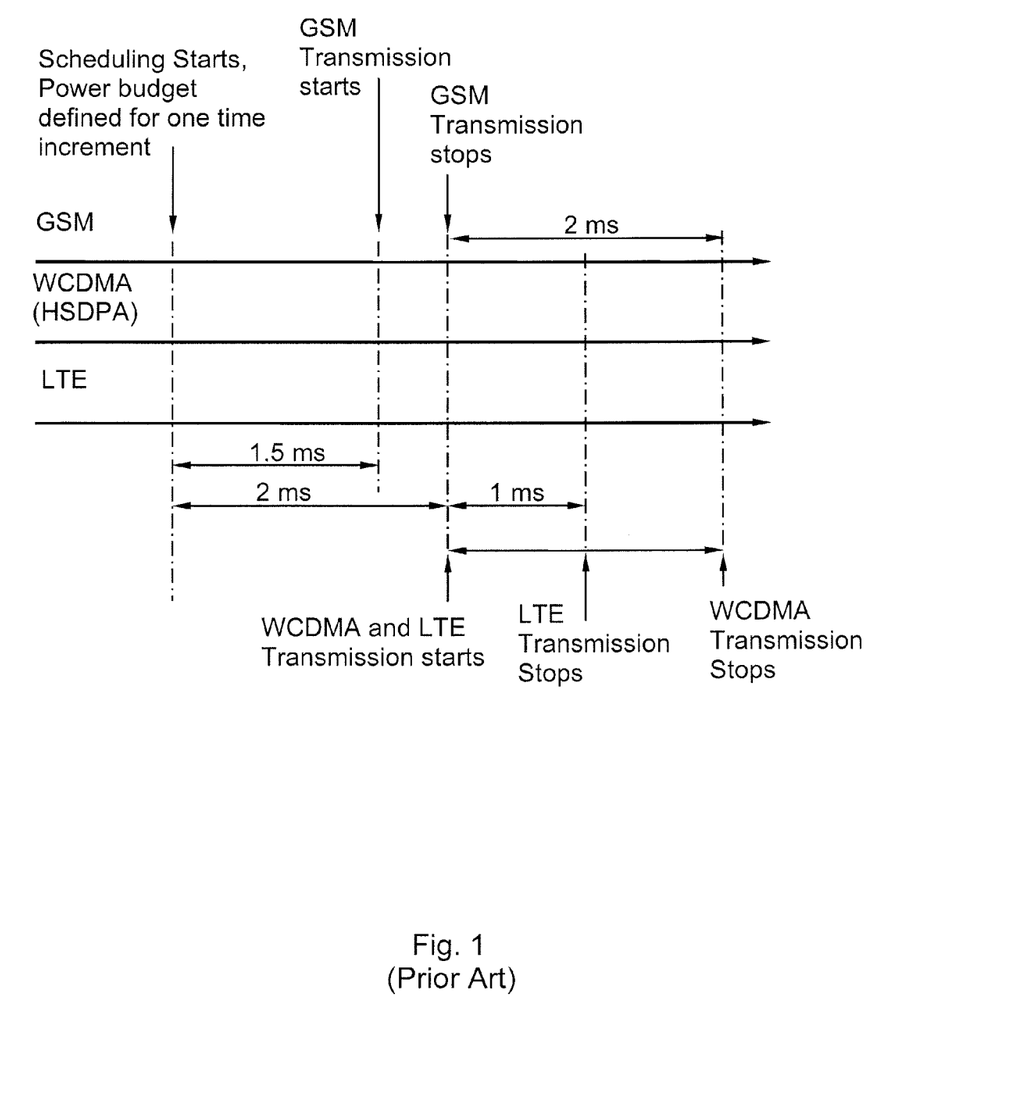
FIG. 1 is a schematic block diagram illustrating scheduling timing in a communication system according to prior art.

Carrier controllers from different systems schedule their power allocation with different time increments, as shown in FIG. 1. In the illustrated example, the scheduling horizon for GSM, WCDMA and LTE respectively, is shown. For GSM the scheduling horizon is 1.5 ms, i.e. the time in advance the GSM base station knows which radio frequency power level a certain time slot must use with a duration of 0.5 ms. For WCDMA and LTE the radio frequency power level must be defined 2 ms before the transmission starts with a duration of 2 ms for WCDMA and a duration of 1 ms for LTE.

Figure 2:
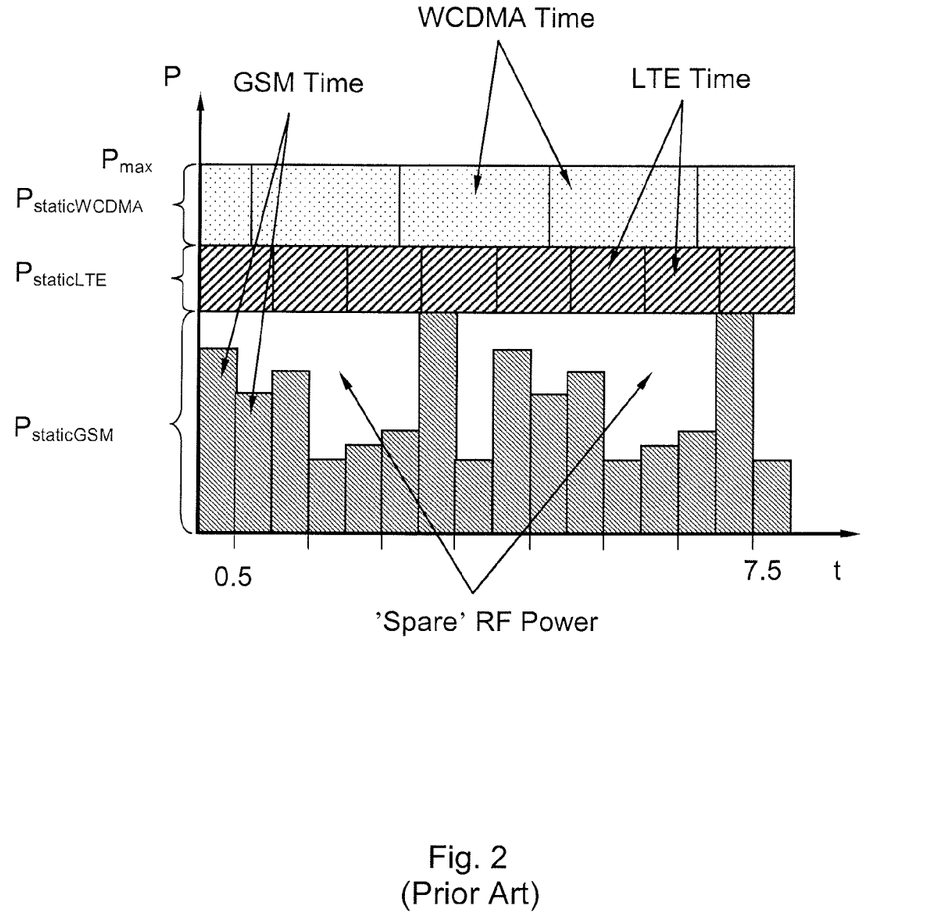
FIG. 2 is a block diagram illustrating static radio frequency power allocation according to prior art.

Existing solutions, as shown in FIG. 2, offers a static, pre-determined allocation of radio frequency power which do not take into account the short-term under-allocation of radio frequency power by other carrier controllers sharing the same MCPA which in reality offers 'spare' power to be used especially when GSM is introduced.

A GSM transmitter is configured for a nominal power which is the maximum power any time slot will use in that transmitter whereas some or all time slots in reality will be transmitted at a lower power than configured.

The available radio frequency power is therefore not always fully used due to the differences between configured and used power or differences between system concepts such as e.g. GSM, WCDMA and LTE as shown in FIG. 2.

A problem with the existing solution is that the potentially available radio frequency power of the MCPA is not used, which leads to a low throughput.

SUMMARY

The present solution aims at providing an improved performance within a communication system.

According to a first aspect, the object is achieved by a method in a first carrier controller, associated with a network node. The method aims at providing distributed power management of a plurality of power amplifiers within a sector. The first carrier controller, the network node and the power amplifiers are comprised within a communication system. Also, at least one further carrier controller is comprised within the communication system. The first carrier controller is arranged for scheduling power allocation at each power amplifier of the radio frequency power estimated to be used by at least one carrier controlled by the first carrier controller. The method comprises allocating the estimated power usage to be used by the at least one carrier controlled by the first carrier controller during a predetermined time frame on one or more power amplifiers within the same sector. The allocation is based on a priority value of each carrier, dedicated to that sector or to a power amplifier within that sector.

According to a second aspect, the object is also achieved by an arrangement in a first carrier controller, associated with a network node. The method aims at providing distributed power management of a plurality of power amplifiers within a sector. The first carrier controller, the network node and the power amplifiers are comprised within a communication system. Also, at least one further carrier controller is comprised within the communication system. The first carrier controller is arranged for scheduling power allocation at each power amplifier of the radio frequency power estimated to be used by at least one carrier controlled by the first carrier controller. The arrangement comprises an allocating unit. The allocating unit is adapted to allocate the estimated power usage to be used by the at least one carrier controlled by the first carrier controller during a predetermined time frame on one or more power amplifiers. The one or more power amplifiers are situated within the same sector. The allocation is based on a priority value of each carrier, dedicated to that sector or to a power amplifier within that sector.

Thanks to the introduction of a dynamic power allocation according to the present methods and arrangements, spare radio frequency power at the power amplifiers within the sector could be distributed between different carriers and/or carrier controllers. Thereby, the power amplifiers within the sector are utilized more efficiently. By performing power allocation according to the present methods, spare power of the power amplifiers within the sector could be reduced, while at the same time reducing the risk of over allocation. Thereby the performance within the communication system is improved.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a first carrier controller, which may be put into practice in the embodiments described below. This invention may, however, be embodied in many different forms and should not be constructed as limited to the embodiments set forth herein; rather, these embodiments are provided so that this disclosure will be thorough and complete, and will fully convey the scope of the invention. It is to be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Figure 3:
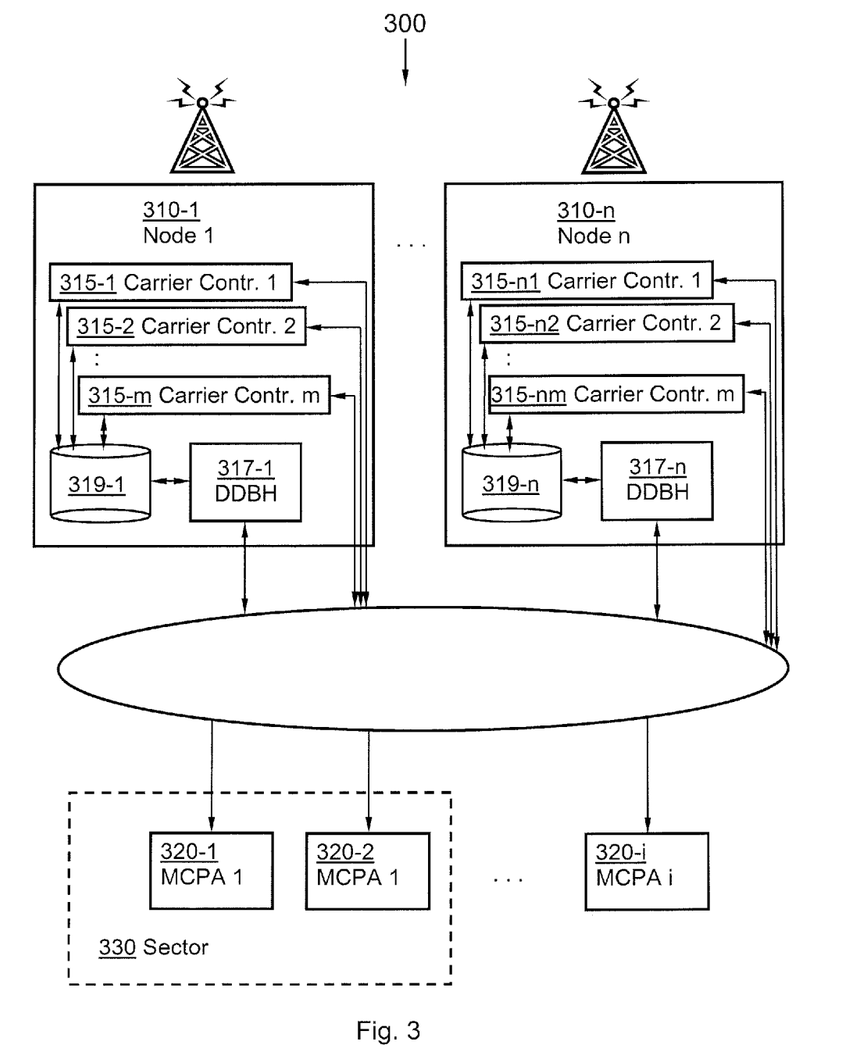
FIG. 3 is a block diagram illustrating embodiments of a communication system.

FIG. 3 is a block diagram illustrating embodiments of a communication system 300. The communication system 300 comprises at least one network node 310-1, ..., 310-n. Each network node 310-1, ..., 310-n is arranged to comprise one or several carrier controllers 315-1, ..., 315-m, 315-n1, ..., 315-nm. Further, the communication system 300 may comprise one or more power amplifiers 320-1, ..., 320-l, or Multi Carrier Power Amplifiers (MCPA), as they also may be referred to.

The technology used within the communication system 300 may comprise one, some, several or all technologies out of Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), Long Term Evolution (LTE), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples.

Each carrier controller 315-1, ..., 315-m, 315-n1, ..., 315-nm may control one carrier i.e. a portion of an air interface carrier, or a plurality of carriers, associated with the traffic type to be used for that carrier.

A carrier may be an air interface carrier, such as e.g. a TRX in a GSM system, a 5 MHz carrier in WCDMA etc, or a subset of a carrier, e.g. the Common Control Signalling part of a WCMDA carrier, the Dedicated Channel (DCH) part of a WCDMA carrier, etc. This allows a fine-grain prioritization between TRXs, standards and traffic types within a standard by adjusting the priority for each carrier, as will be further explained in detail in association with FIGS. 5 and 6.

The network node 310-1, ..., 310-n may be referred to as e.g. a base station, a Multi-Standard Radio (MSR), a Remote Radio Unit, an access point, a Node B, an evolved Node B (eNode B) and/or a base transceiver station, Access Point Base Station, base station router, etc depending e.g. of the radio access technology and terminology used.

Each network node 310-1, ..., 310-n may also be arranged to comprise a distributed database 319-1, ..., 319-n and a Distributed Database Handler (DDBH) 317-1, ..., 317-n. The distributed database 319-1, 319-n may be arranged to comprise a radio frequency power utilization plan. The radio frequency power utilization plan may be used, according to some embodiments for exchanging wanted power allocation from each carrier controller 315-1, ..., 315-m, 315-n1, ..., 315-nm.

Further, the communication system 300 comprises a plurality of sectors 330. The sector 330 corresponds to a geographical area served by the communication system 300. The sector 330 is realized by having one or more transmission antennas and reception antennas directed towards the area of the sector 330. Each sector 330 thus comprises at least one power amplifier 320-1, ..., 320-i, feeding the one or more transmission antennas. A power amplifier group, or MCPA group, is a set of power amplifiers 320-1, ..., 320-i operating in the same sector 330. Some carrier controllers 315-1, ..., 315-m, 315-n1, ..., 315-nm may have a group of carriers transmitted by multiple power amplifiers 320-1, ..., 320-i in the sector, such as a Multiple Input Multiple Output (MIMO) transmission in LTE, denoted a carrier group. Some carrier controllers 315-1, ..., 315-m, 315-n1, ..., 315-30 nm have single carriers, and is not dependent on the instantaneous selection of power amplifier 320-1, ..., 320-i, as long as it is within the same power amplifier group, i.e. in the same sector 330.

According to some embodiments, the communication system 300 may be based e.g. on the Common Public Radio Interface (CPRI) standard. The CPRI standard defines the interface of base stations between the Radio Equipment Controllers (REC) in the standard, to local or remote radio units, e.g. Radio Equipment (RE). The database distribution may be done e.g. on the sub channels defined for vendor specific usage and/or fast C&M channel.

Figure 4:
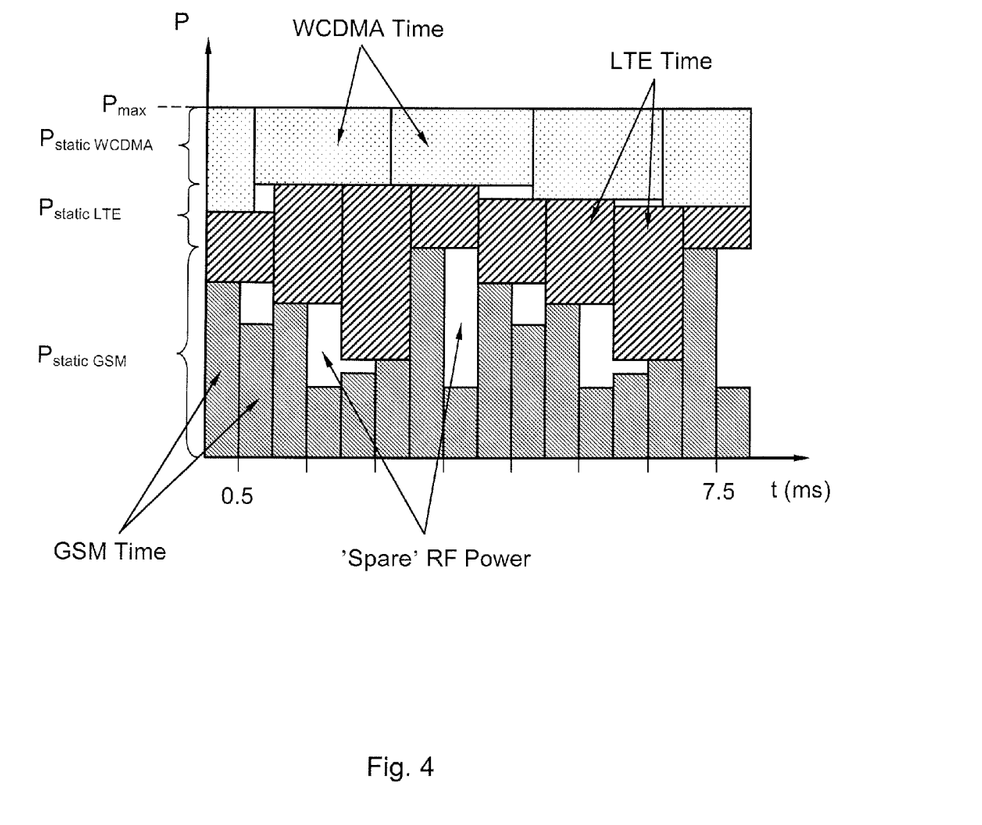
FIG. 4 is a block diagram illustrating dynamic power allocation in a communication system according to some embodiments of the present method.

FIG. 4 is a block diagram illustrating dynamic power allocation in a communication system 300 according to some embodiments of the present method.

The present method aims at to distributing the 'spare' radio frequency power, dynamically between the carrier controllers 315-1, ..., 315-*m*, 315-*n*1, ..., 315-*nm* in order to use a group of power amplifiers 320-1, ..., 320-*i* with increased efficiency. As seen when comparing the 'spare' radio frequency power in the illustration in FIG. 2 with the illustration in FIG. 4, the amount of 'spare' radio frequency power of the power amplifier 320-1, ..., 320-*i* may be reduced when applying the present method.

The exchange may be carried out in real-time as shown in FIG. 4 and performed by all carrier controllers 315-1, ..., 315-*m*, 315-*n*1, ..., 315-*nm* through e.g. a distributed data base 319-1, ..., 319-*n*. However, the information exchange may according to some embodiments be performed by other means of communication, e.g. by direct communication between the carrier controllers 315-1, ..., 315-*m*, 315-*n*1, ..., 315-*nm*.

The carrier controller 315-1, ..., 315-*m*, 315-*n*1, ..., 315-*nm* that has the shortest time interval for scheduling power allocation, determines the exchange frequency. In the example shown in FIG. 5 it is GSM that distributes a new radio frequency power utilization plan every 0.5 ms.

When the power amplifier 320-1, ..., 320-*i* is shared by systems of different standards, or carrier controllers, such as GSM, WCDMA and/or LTE, or when the power amplifier 320-1, ..., 320-*i* is shared by several carrier controllers 315-1, ..., 315-*m*, 315-*n*1, ..., 315-*nm* of the same standard, there may be an amount of 'spare' power to be distributed to other carrier controllers 315-1, 315-*m*, 315-*n*1, ..., 315-*nm*.

If this is performed within the scheduling time frame for each system, it may improve throughput compared with a static configured system as previously discussed in association with FIG. 2.

The present methods and systems may be possible to implement in low-level software or even in hardware, or a combination thereof. Some possible advantages with hardware implementation may be that the implementation becomes cheap and it may be possible to operate on sub ms level.

For a GSM only system, the present method may increase the usage of one or more power amplifiers 320-1, ..., 320-*i* operating in the same sector 330.

For a mixed GSM+ other system, such as e.g. WCDMA or LTE, the present method may balance the GSM power allocation of the power amplifiers 320-1, ..., 320-*i* in the same sector 330, thus optimizing the gain of MIMO or Transmit Diversity (TX Diversity) for the other system.

Figure 5:
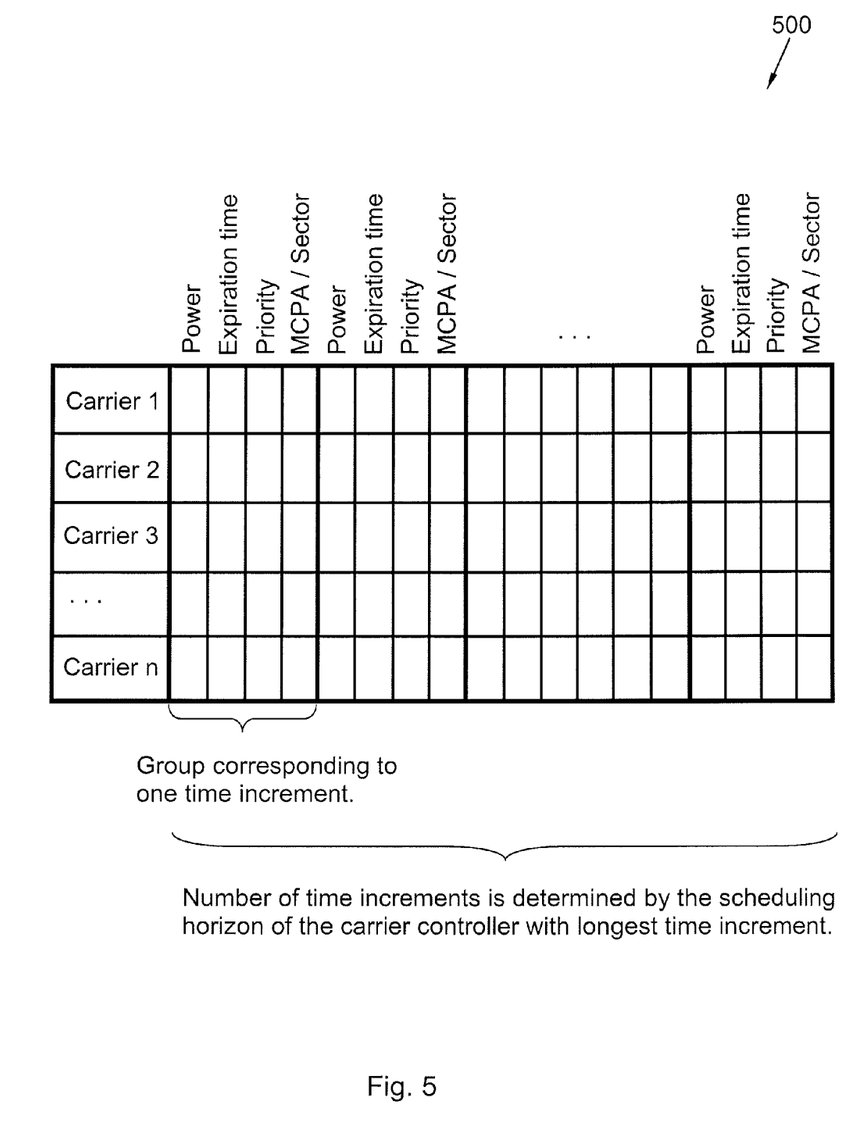
FIG. 5 is a block diagram illustrating exemplary radio frequency power utilization between GSM and WCDMA/LTE, according to some embodiments of the present method.

FIG. 5 is a block diagram illustrating an exemplary radio frequency power utilization plan 500, according to some embodiments of the present method.

The radio frequency power utilization plan 500 comprises a number of information element groups, where each group may comprise e.g. the wanted power, expiration time, priority, selected power amplifier 320-1, ..., 320-*i* and/or sector 330 for each carrier for the next time increment, just to mention some non-exhaustive examples of parameters. According to some embodiments, the selected sector 330 may be comprised in the information element group, e.g. in addition to the previously enumerated parameters, or instead of selected power amplifier 320-1, ..., 320-*i*.

The number of groups, time increments in the plan 500 is determined by the carrier controller 315-1, ..., 315-*m*, 315-*n*1, ..., 315-*nm* with the longest scheduling time horizon.

The updated radio frequency power utilization plan 500 may according to some embodiments be written to a local copy in each network node 310-1, ..., 310-*n* of a distributed database 319-1, ..., 319-*n* and the DDBH 317-1, ..., 317-*n* may be notified by the updating carrier controller 315-1, ..., 315-*m*, 315-*n*1, ..., 315-*nm*. The DDBH 317-1, ..., 317-*n* may then distribute the update via the communication system 300, according to some embodiments.

When any network node 310-1, ..., 310-*n* receives an update, the DDBH 317-1, ..., 317-*n* thus may update the local copy in the distributed database 319-1, ..., 319-*n* and may notify the carrier controller 315-1, ..., 315-*m*, 315-*n*1, ..., 315-*nm* of the receiving network node 310-1, ..., 310-*n*.

In due time for the carrier to be transmitted, the carrier controller 315-1, ..., 315-*m*, 315-*n*1, ..., 315-*nm* investigates what power amplifier 320-1, ..., 320-*i* the carrier is to be output on. This may be the case mainly for GSM, where well in advance for the GSM time slot to start, it is concluded which power amplifier 320-1, ..., 320-*i* to transmit it. The GSM time slot data may then be sent to the intended power amplifier 320-1, ..., 320-*i*. This may be done in at least two ways: The power amplifier 320-1, ..., 320-*i* may have virtual carriers set up for all possible carriers for that power amplifier 320-1, ..., 320-*i*. The GSM IQ stream generator may copy the IQ samples for that time slot onto one of the virtual carriers for the intended power amplifier 320-1, ..., 320-*i*.

An alternative may be to forward the unmodulated GSM time slot to the IQ stream generator, statically configured to output to the intended power amplifier 320-1, ..., 320-*i*, so called Base Band Hopping.

Figure 6:
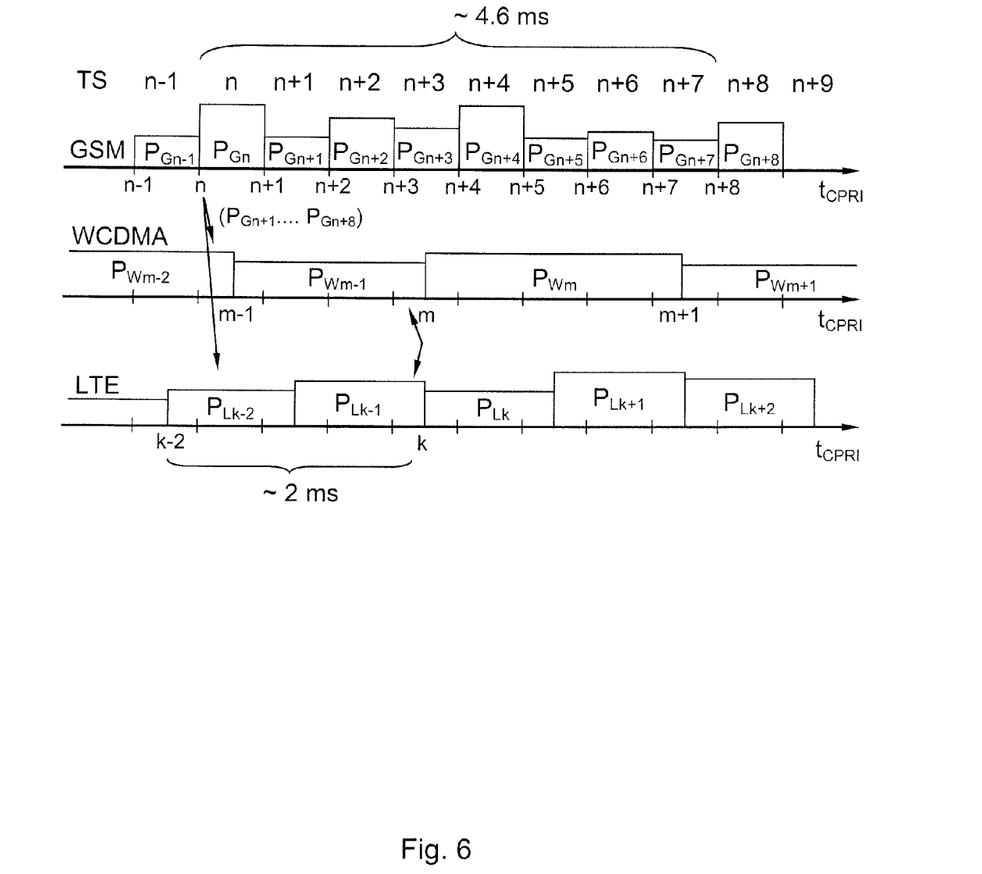
FIG. 6 is a block diagram illustrating an exemplary radio frequency power utilization plan, according to some embodiments of the present method.

FIG. 6 is a block diagram illustrating exemplary radio frequency power utilization between GSM and WCDMA/LTE, according to some embodiments of the present method.

At the time point n in FIG. 6, the GSM may distribute a new radio frequency power utilization plan 500 for the next 8 time slots, corresponding to e.g. 4.6 ms, every 0.5 ms, according to some embodiments. It is however to be noted that the information comprised in the radio frequency power utilization plan 500 may be distributed to other carrier controllers 315-1, ..., 315-*m*, 315-*n*1, ..., 315-*nm* in any arbitrary way, such as e.g. via a dedicated message to each other carrier controller 315-1, ..., 315-*m*, 315-*n*1, ..., 315-*nm*. According to some embodiments however, the content of the radio frequency power utilization plan 500 may be distributed to other carrier controllers 315-1, ..., 315-*m*, 315-*n*1, ..., 315-*nm* by means of a distributed database 319-1, ..., 319-*n*.

At the time point m in FIG. 5, the WCDMA/LTE allocates for the next 2/1 ms based on power info GSM, or other system, given 2 ms earlier.

When the carrier controller 315-1, ..., 315-*m*, 315-*n*1, ..., 315-*nm* is about to schedule its power allocation for the next time increment for the at least one carrier controlled by the carrier controller 315-1, ..., 315-*m*, 315-*n*1, ..., 315-*nm*, for example as shown in FIG. 5, it may request to get the updated version of the radio frequency power utilization plan 500.

Following a priority based algorithm, the carrier controller 315-1, ..., 315-*m*, 315-*n*1, ..., 315-*nm* calculates power and end time. The carrier controller 315-1, ..., 315-*m*, 315-*n*1, ..., 315-*nm* may then update the radio frequency power utilization plan 500 and notify the DDBH 317-1, ..., 317-*n*.

One priority may be set per carrier, according to some embodiments. Further, according to some embodiments, the same priority may be set over the entire power utilization plan. However, according to other embodiments, the priority may be altered over time, e.g. at certain time intervals. In a non limiting example, the priority may be set e.g. every time slot.

According to some embodiments of the present method, it may be known, or extracted from the configuration which power amplifier group, or sector 330, a certain carrier may be output on, or if a specific power amplifier 320-1, ..., 320-i, may be used. For example, for two carriers being part of a MIMO carrier group, one carrier may be configured to be output on the first power amplifier 320-1, the second carrier on the second power amplifier 320-2, etc.

The priority based algorithm may allocate power from the available power of all the power amplifiers 320-1, ..., 320-i within the power amplifier group, or within the sector 330, following the priority of each carrier. The algorithm may use the freedom to select power amplifier 320-1, ..., 320-i for some carries, such as e.g. GSM TRX to accommodate maximum similar power allocation for carriers in a carrier group. Thus for example all GSM traffic may be directed to a first power amplifier 320-1 and all data traffic from WCDMA and/or LTE to a second power amplifier 320-2 within the same sector 330.

The present method may schematically be described as a number of method steps 1-6, which may be at least partly iterated for each next schedulable time increment, e.g. 0.5-4 ms, according to some embodiments. It is to be noticed that the enumerated method steps 1-6 are purely exemplary for the purpose of presenting an embodiment of the present method. Other embodiments of the present method may not comprise all, or even any of the here presented method steps 1-6, and/or may be performed in any other arbitrary order.

Step 1

An estimation concerning the radio frequency power to be used by the at least one carrier controlled by the first carrier controller 315-1 during a predetermined time frame, such as e.g. 8 time slots, may be performed.

Step 2

The estimated needed power of the at least one carrier controlled by the first carrier controller 315-1 may be distributed to the other carrier controllers 315-1, ..., 315-m, 315-n1, ..., 315-nm, e.g. to all other carrier controllers 315-1, ..., 315-m, 315-n1, ..., 315-nm. The distribution may be made by distributing a radio frequency power utilization plan 500 e.g. by means of a distributed database 319-1, ..., 319-n.

The radio frequency power utilization plan 500 may comprise e.g. the planned radio frequency power allocation, expiration time, priority value and a reference or dedication to a sector 330 and/or a power amplifier 320-1, ..., 320-i, associated with the own carrier controller 315-1, as well as with other carrier controllers 315-1, ..., 315-m, 315-n1, ..., 315-nm.

Step 3

The estimated needed power of the other carrier controllers 315-1, ..., 315-m, 315-n1, ..., 315-nm, and possibly other parameters that may be comprised in the radio frequency power utilization plan 500 may be obtained e.g. from the distributed data base 319-1, ..., 319-n.

Step 4

Each carrier controller 315-1, ..., 315-m, 315-n1, ..., 315-nm thus have access to the information comprised within the radio frequency power utilization plan 500. Based on that information, an allocation of the carriers controlled by the carrier controllers 315-1, ..., 315-m, 315-n1, ..., 315-nm on the power amplifiers 320-1, ..., 320-i within the same sector 330 may be performed.

According to some embodiments, a comparison may be made against a maximum power limit threshold value of each power amplifier 320-1, ..., 320-i within the same sector 330.

If the maximum power limit threshold value is not exceeded for any of the power amplifiers 320-1, ..., 320-i, according to some embodiments each carrier controller 315-1, ..., 315-m, 315-n1, ..., 315-nm may be allocated the estimated power and the indicated power amplifier 320-1, ..., 320-i. However, according to some embodiments, some prioritized carriers and/or carriers associated with access technologies like WCDMA and/or LTE may be allowed to increase their allocated power, until the maximum power limit threshold value is reached. However, according to some embodiments, the carriers may be allocated power amplifier 320-1, ..., 320-i, depending on the used access technology.

However, if the maximum power limit threshold value is exceeded, a reallocation may be performed. According to some embodiments, the at least one carrier having the lowest priority, may be reallocated to another power amplifier 320-1, ..., 320-i in the same sector 330. Thus the carrier having the lowest priority may be allocated the required amount of power, but on another power amplifier 320-1, ..., 320-i in the same sector 330. According to some embodiments, the carrier having the lowest priority may be allocated lowered power, or perhaps not allocated any power at all within the time frame.

Step 5

The values updated in step 4 may be distributed to other carrier controllers 315-1, ..., 315-m, 315-n1, ..., 315-nm. According to some embodiments, the radio frequency power utilization plan 500 may be updated and then distributed to all carrier controllers 315-1, ..., 315-m, 315-n1, ..., 315-nm using e.g. a distributed database mechanism.

Yet an Embodiment

However, according to some embodiments, an allocation may be performed by allocating the carriers controlled by the carrier controllers 315-1, ..., 315-m, 315-n1, ..., 315-nm in priority order, starting with the most prioritised. For each carrier, the power amplifier 320-1, ..., 320-i within the same sector 330 with most available capacity may be selected. If a MIMO carrier is detected, the power may be allocated to at least two power amplifiers 320-1, ..., 320-i within the same sector 330. This allocation of carriers in priority order may continue until a carrier cannot be allocated within any of the power amplifiers 320-1, ..., 320-i within the sector 330. Then that carrier may be reduced until it could be allocated on the power amplifier 320-1, ..., 320-i with most available capacity.

Thereby, the carrier "N" is allocated reduced power, however, some power may still be allocated for the carrier "N+1".

Just to mention one arbitrary example, a sector 330 may comprise two power amplifiers, 320-1 and 320-2. The first power amplifier 320-1 may have 7 W available remaining power and the second power amplifier 320-2 may have 5 W available. If a carrier with priority "N", wants 9 W, that carrier may be allocated 7 W at the first power amplifier 320-1. Thus the next carrier in order, with priority "N+1" may be allocated all the 5 W remaining on the second power amplifier 320-2, in spite of having lower priority than the first carrier with priority "N".

According to some embodiments, it may be signalled or indicated in some way that a carrier is of MIMO type. According to some embodiments, the MIMO type carrier may indicate e.g. in the radio frequency power utilization plan 500, or in any other way that they want power allocated on at least two power amplifiers, 320-1 and 320-2 within a sector 330.

Figure 7:
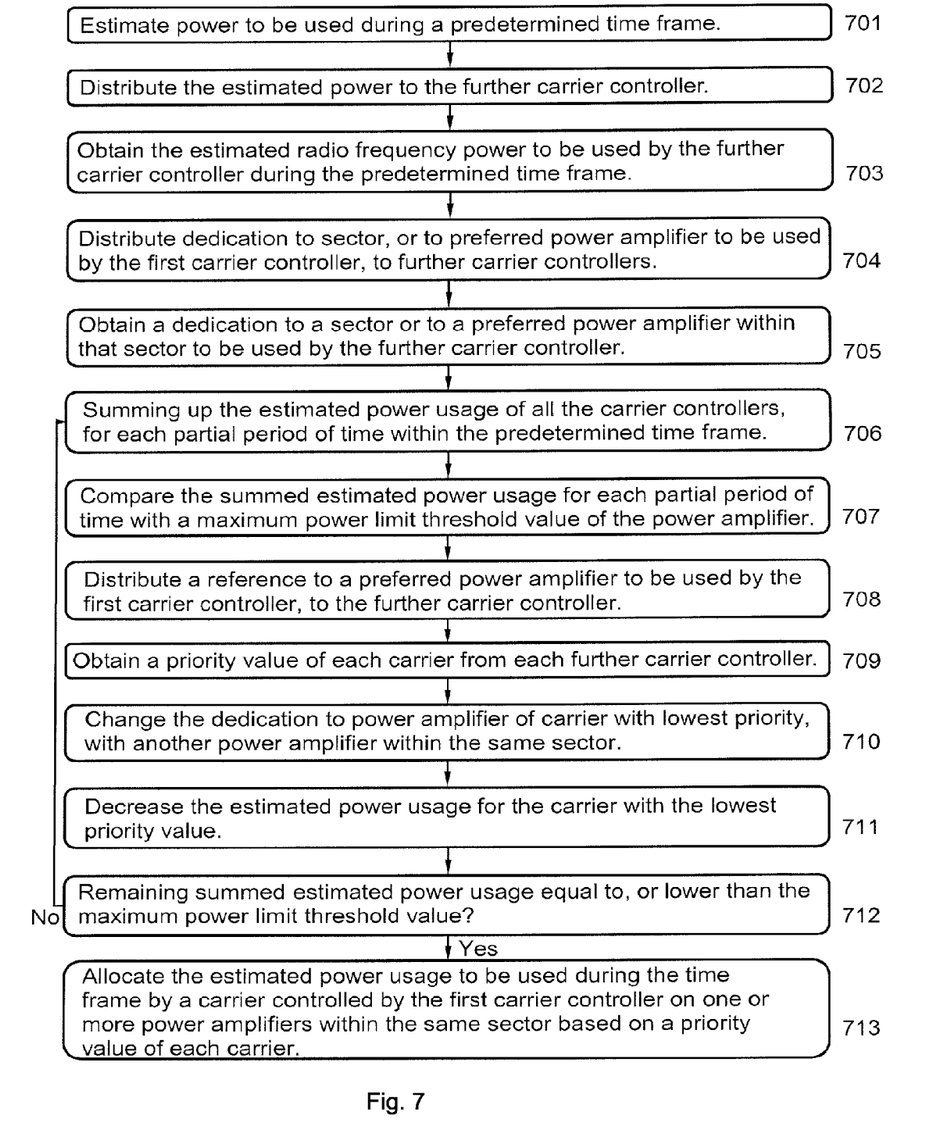
FIG. 7 is a flow chart illustrating an embodiment of the present method in a first carrier controller.

FIG. 7 is a flow chart illustrating embodiments of method steps 701-707 performed in a first carrier controller 315-1. The method aims at performing distributed power management of a plurality of power amplifiers 320-1, ..., 320-*i* within a sector 330. The first carrier controller 315-1 is associated with a network node 310-1, ..., 310-*n*. The first carrier controller 315-1, the network node 310-1, ..., 310-*n* and the power amplifiers 320-1, ..., 320-*i* are comprised within a communication system 300. The communication system 300 further also comprises at least one further carrier controller 315-2, ..., 315-*m*, 315-*n*1, ..., 315-*nm*.

The first carrier controller 315-1 is arranged for scheduling power allocation at each power amplifier 320-1, ..., 320-*i* of the radio frequency power estimated to be used by at least one carrier controlled by the first carrier controller 315-1.

The at least one carrier controlled by the first carrier controller 315-1 and/or the carriers controlled by the further carrier controllers 315-2, ..., 315-*m*, 315-*n*1, ..., 315-*nm* may be associated with any radio technology out of the group: GSM, WCDMA, LTE.

To appropriately perform the distributed power management of a plurality of power amplifiers 320-1, ..., 320-*i*, the method may comprise a number of method steps 701-713.

It is however to be noted that some of the described method steps are optional and only comprised within some embodiments. Further, it is to be noted that the method steps 701-713 may be performed in any arbitrary chronological order and that some of them, e.g. step 701 and step 702, or even all steps 701-713 may be performed simultaneously or in an altered, arbitrarily rearranged, decomposed or even completely reversed chronological order. The method may comprise the following steps:

Step 701

This step is optional and may only be performed within some embodiments.

The radio frequency power to be used by the at least one carrier controlled by the first carrier controller 315-1 during a predetermined time frame, may be estimated.

The predetermined time frame may according to some embodiments be between 0.5 ms and 6 ms. The predetermined time frame may be e.g. 8 time slots in GSM, corresponding to 4.6 ms.

Step 702

This step is optional and may only be performed within some embodiments.

The estimated radio frequency power may be distributed to the further carrier controller 315-2, ..., 315-*m*, 315-*n*1, ..., 315-*nm*. According to some embodiments, the distribution may be performed by updating the distributed data base 317.

Step 703

This step is optional and may only be performed within some embodiments.

The estimated radio frequency power to be used by the at least one carrier controlled by the further carrier controller 315-2, ..., 315-*m*, 315-*n*1, ..., 315-*nm* during the predetermined time frame may be obtained. According to some embodiments, the parameter estimated radio frequency power to be used by the further carrier controller 315-2, ..., 315-*m*, 315-*n*1, ..., 315-*nm* may be obtained from the distributed data base 317.

Step 704

This step is optional and may only be performed within some embodiments.

A dedication to a sector 330 or to a preferred power amplifier 320-1, ..., 320-*n* within that sector 330 may be distributed to be used by the first carrier controller 315-1, to the further carrier controller 315-2, ..., 315-*m*, 315-*n*1, ..., 315-*nm*. According to some embodiments, the distribution may be performed by updating the distributed data base 317.

Step 705

This step is optional and may only be performed within some embodiments.

A dedication to a sector 330 or to a preferred power amplifier 320-1, ..., 320-*n* within that sector 330 to be used by the further carrier controller 315-2, ..., 315-*m*, 315-*n*1, ..., 315-*nm* may be obtained. The dedication may be obtained from the distributed data base 317, according to some embodiments.

Step 706

This step is optional and may only be performed within some embodiments.

The estimated power usage of all the carriers controlled by the carrier controllers 315-1, 315-2, ..., 315-*m*, 315-*n*1, ..., 315-*nm*, for each partial period of time within the predetermined time frame may be summed up.

Step 707

This step is optional and may only be performed within some embodiments.

The summed estimated power usage for each partial period of time may be compared with a maximum power limit threshold value of the power amplifier 320.

Such comparison of the summed estimated power usage for each partial period of time with a maximum power limit threshold value of the power amplifier 320-1, ..., 320-*n*, may, according to some embodiments comprise comparing the summed estimated power usage of all carriers which have a dedication to a sector 330 or to a preferred power amplifier 320-1, ..., 320-*n* within that sector 330, for each partial period of time, with a maximum power limit threshold value of each power amplifier 320-1, ..., 320-*n* within that sector 330.

Step 708

This step is optional and may only be performed within some embodiments.

A priority value of the at least one carrier comprised within the first carrier controller 315-1 may be distributed to the further carrier controller 315-2, ..., 315-*m*, 315-*n*1, ..., 315-*nm*. According to some embodiments, the distribution may be performed by updating the distributed data base 317.

Step 709

This step is optional and may only be performed within some embodiments.

A priority value of the at least one carrier comprised within each further carrier controller 315-2, ..., 315-*m*, 315-*n*1, ..., 315-*nm* may be obtained. According to some embodiments, the priority value may be obtained from the distributed data base 317.

Step 710

This step is optional and may only be performed within some embodiments.

The dedication to the preferred power amplifier 320-1, ..., 320-*n* of the carrier with the lowest priority may be changed for a dedication to another power amplifier 320-1, ..., 320-*n* within the same sector 330.

The step of changing dedication may according to some further optional embodiments be performed if the maximum power limit threshold value of the certain power amplifier 320-1, ..., 320-*n* within the sector 330 is exceeded by the summed estimated power usage for a certain partial period of time.

According to some embodiments, the carrier has a dedication to a sector 330 comprising a plurality of power amplifiers 320-1, ..., 320-*n*. A dedication may be set dedication to any power amplifier 320-1, ..., 320-*n* within the same sector 330, e.g. to the power amplifier 320-1, ..., 320-*n* with most available capacity at the moment.

Step 711

This step is optional and may only be performed within some embodiments.

The estimated power usage for the at least one carrier comprised within the first carrier controller 315-1 or the at least one carrier controlled by the further carrier controller 315-2, ..., 315-*m*, 315-*n*1, ..., 315-*nm* with the lowest priority value may be decreased.

When the estimated power usage for any carrier cannot be allocated to any of the power amplifiers 320-1, ..., 320-*n* within the sector 330 without exceeding the maximum power limit threshold value of any power amplifier 320-1, ..., 320-*n*, the estimated power usage for the carrier with lowest priority may be reduced until the maximum power limit threshold value of the power amplifier 320-1, ..., 320-*n* with most available capacity at the moment may be performed, according to some embodiments.

Step 712

This step is optional and may only be performed within some embodiments.

The step 706 of summing up the estimated power usage, the step 707 of comparing the summed estimated power usage with the maximum power limit threshold value and the step 711 of decreasing the estimated power usage for the carrier with the lowest priority value, may be repeated until the remaining summed estimated power usage is equal to or lower than the maximum power limit threshold value of each respective power amplifier 320-1, ..., 320-*n* within the sector 330, according to some embodiments.

Step 713

Allocate the estimated power usage to be used by the at least one carrier controlled by the first carrier controller 315-1 during a predetermined time frame on one or more power amplifiers 320-1, ..., 320-*i* within the same sector 330, based on a priority value of each carrier controller 315-1, ..., 315-*m*, 315-*n*1, ..., 315-*nm*, dedicated to that sector 330 or to a power amplifier 320-1, ..., 320-*i* within that sector 330.

Further, according to some embodiments, the estimated power usage may be distributed to the further carrier controllers 315-2, ..., 315-*m*, 315-*n*1, ..., 315-*nm*. According to some embodiments, the distribution may be performed by updating the distributed data base 317.

According to some embodiments, the allocation may comprise allocating the carrier with the highest priority to the power amplifier 320-1, ..., 320-*i* within the sector 330, that have most available capacity at the moment. If the carrier is associated with MIMO, the power may be allocated to a plurality of power amplifiers 320-1, ..., 320-*i* within the sector 330. The allocation of carriers may be continued in priority order until there is not possible to allocate all the estimated power of a particular carrier. The allocated power for that particular carrier controller 315-1, ..., 315-*m*, 315-*n*1, ..., 315-*nm* may then be reduced until the maximum power limit threshold value of the power amplifier 320-1, ..., 320-*i* is not exceeded.

Figure 8:
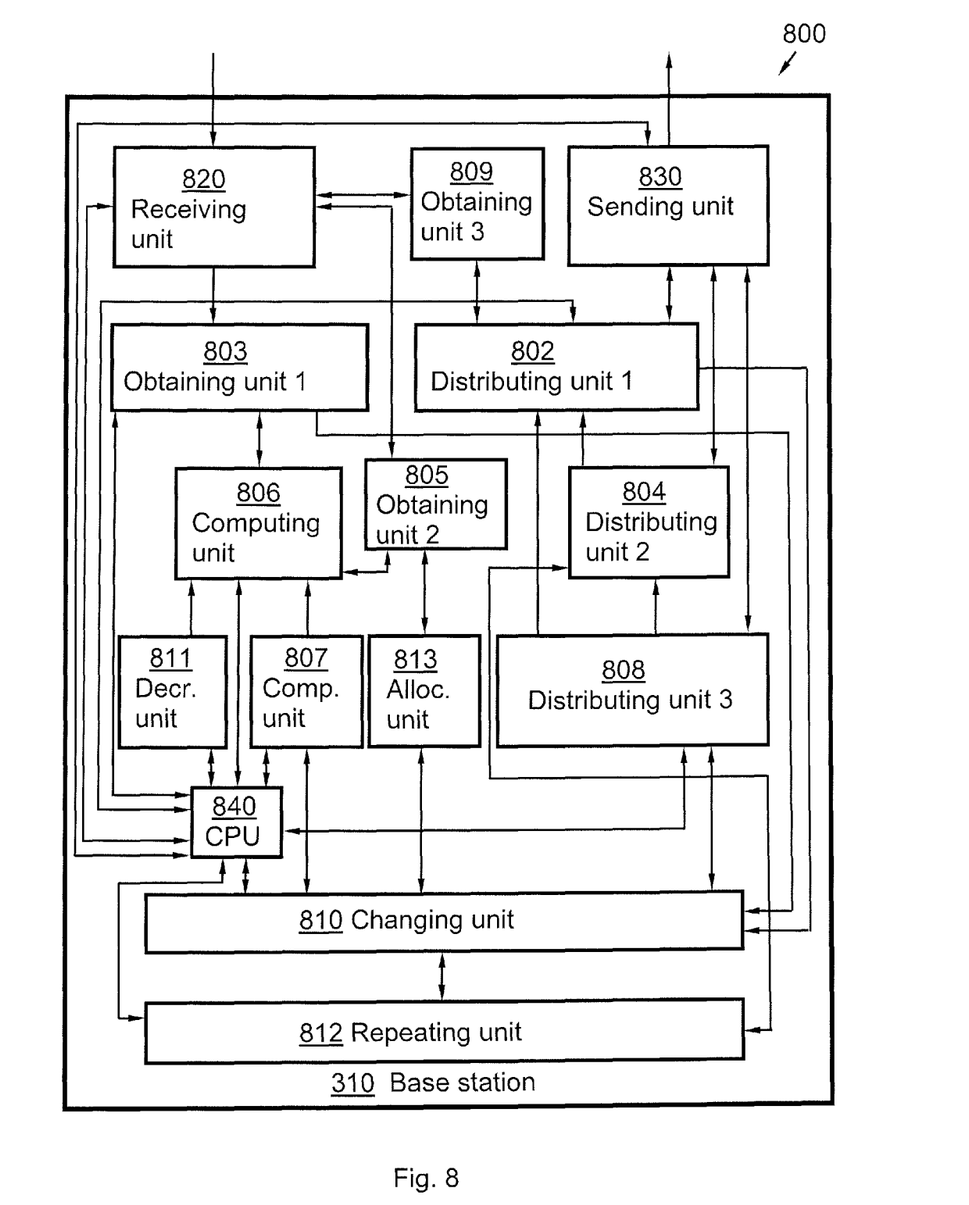
FIG. 8 is a block diagram illustrating embodiments of the present arrangement in a first carrier controller.

FIG. 8 is a block diagram illustrating embodiments of an arrangement 800 situated in a first carrier controller 315-1, associated with a network node 310-1, ..., 310-*n*. The arrangement 800 is configured to perform the method steps 701-713 for distributed power management of a plurality of power amplifiers 320-1, ..., 320-*i* within a sector 330. The first carrier controller 315-1, the network node 310-1, ..., 310-*n*, the power amplifiers 320-1, ..., 320-*i* and the sectors 330 are comprised within a communication system 300 together with at least one further carrier controller 315-2, ..., 315-*m*, 315-*n*1, ..., 315-*nm*. The first carrier controller 315-1 is arranged for scheduling power allocation at the power amplifiers 320-1, ..., 320-*i* of the radio frequency power estimated to be used by at least one carrier controlled by the first carrier controller 315-1.

For the sake of clarity, any internal electronics of the arrangement 800, not completely necessary for performing the present method has been omitted from FIG. 8.

The arrangement 800 comprises an allocating unit 813. The allocating unit 813 is adapted to allocate the estimated power usage to be used by the at least one carrier controlled by the first carrier controller 315-1 during a predetermined time frame on one or more power amplifiers 320-1, ..., 320-*i* within the same sector 330. The allocation is based on a priority value of each carrier controller 315-1, ..., 315-*m*, 315-*n*1, ..., 315-*nm*, dedicated to that sector 330 or to a power amplifier 320-1, ..., 320-*i* within that sector 330.

Further, the arrangement 800 may comprise, according to some embodiments an estimation unit 801. The estimation unit 801 may be adapted to estimate the radio frequency power to be used by the at least one carrier controlled by the first carrier controller 315-1 during a predetermined time frame.

Further yet, the arrangement 800 according to some embodiments may comprise a distribution unit 802. The distribution unit 802 may be adapted to distribute the estimated radio frequency power to the further carrier controller 315-2, ..., 315-*m*, 315-*n*1, ..., 315-*nm*.

Also, the arrangement 800 further may comprise an obtaining unit 803. The obtaining unit 803 may be adapted to obtain the estimated radio frequency power to be used by the at least one carrier controlled by the further carrier controller 315-2, 315-*m*, 315-*n*1, ..., 315-*nm* during the predetermined time frame, according to some embodiments.

Still further, the arrangement 800 in addition may comprise a second distributing unit 804. The second distributing unit 804 may be arranged to distribute a dedication to a sector 330 or to a preferred power amplifier 320-1, ..., 320-*n* within that sector 330 to be used by the at least one carrier controlled by the first carrier controller 315-1, to the further carrier controller 315-2, ..., 315-*m*, 315-*n*1, ..., 315-*nm*, according to some embodiments.

Also, in addition, the arrangement 800 may comprise a second obtaining unit 805. The second obtaining unit 805 may be arranged to obtain a dedication to a sector 330 or to a preferred power amplifier 320-1, ..., 320-*n* within that sector 330 to be used by the at least one carrier controlled by the further carrier controller 315-2, ..., 315-*m*, 315-*n*1, ..., 315-*nm*.

Additionally, the arrangement 800 also may further comprise, according to some embodiments, a computing unit 806. The computing unit 806 may be adapted to sum up the estimated power usage of all the carriers controlled by all the carrier controllers 315-1, 315-2, ..., 315-*m*, 315-*n*1, ..., 315-*nm*, for each partial period of time within the predetermined time frame.

The arrangement 800 may in addition further also comprise a comparison unit 807. The comparison unit 807 may optionally be adapted to compare the summed estimated power usage for each partial period of time with a maximum power limit threshold value of the power amplifiers 320-1, ..., 320-*i*, according to some embodiments.

Further, the arrangement 800 also may, in addition, comprise a distributing unit 808. The distributing unit 808 may be adapted to distribute a priority value of the at least one carrier controlled by the first carrier controller 315-1, to the further carrier controller 315-2, ..., 315-*m*, 315-*n*1, ..., 315-*nm*.

In further optional addition, the arrangement 800 may also comprise an obtaining unit 809. The obtaining unit 809 may be adapted to obtain a priority value of each at least one carrier controlled by each further carrier controller 315-2, ..., 315-$m$, 315-$n1$, ..., 315-$nm$.

Further yet, the arrangement 800 also may comprise a changing unit 810. The changing unit 810 may be adapted to change the dedication to the preferred power amplifier 320-1, ..., 320-$n$ of the carrier with the lowest priority, with a dedication to another power amplifier 320-1, ..., 320-$n$ within the same sector 330.

Also, the arrangement 800 further yet may comprise a decreasing unit 811. The decreasing unit 811 may be adapted to decrease the estimated power usage for the at least one carrier controlled by the first carrier controller 315-1 or the at least one carrier controlled by the further carrier controller 315-2, ..., 315-$m$, 315-$n1$, ..., 315-$nm$ with the lowest priority value.

In still further added optional embodiments, the arrangement 800 may comprise also a repeating unit 812. The repeating unit 812 may be adapted to repeat the steps of summing up 706 the estimated power usage, comparing 707 the summed estimated power usage with the maximum power limit threshold value and decreasing 711 the estimated power usage for the carrier with the lowest priority value, until the remaining summed estimated power usage is equal to or lower than the maximum power limit threshold value.

Also, the arrangement 800 optionally may comprise a receiving unit 820 and/or a transmitting unit 830.

It is to be noted that the described units 801-840 comprised within the arrangement 800 may be regarded as separate logical entities but not with necessity as separate physical entities. Any, some or all of the units 801-840 may be comprised or co-arranged within the same physical unit. However, in order to facilitate the understanding of the functionality of the arrangement 800, the comprised units 801-840 are illustrated as separate physical units in FIG. 8.

Thus the transmitting unit 830 and e.g. the receiving unit 820 may, according to some embodiments, be comprised within one physical unit, a transceiver, which may comprise a transmitter circuit and a receiver circuit, which respectively transmits outgoing radio frequency signals and receives incoming radio frequency signals via an optional antenna. The antenna may be an embedded antenna, a retractable antenna or any other arbitrary antenna without departing from the scope of the present embodiments.

The arrangement 800 may according to some embodiments comprise a processor unit 840. The processor unit 840 may be represented by e.g. a Central Processing Unit (CPU), a processor, a microprocessor, or other processing logic that may interpret and execute instructions. The processor unit 840 may perform all data processing functions for inputting, outputting, and processing of data including data buffering and device control functions, such as call processing control, user interface control, or the like.

Computer Program Product

Any, some or all of the method steps 701-713 may be implemented through one or more processor units 840, together with computer program code for performing the functions of the present method steps 701-713. Thus a computer program product, comprising instructions for performing the method steps 701-713 may perform a distributed power management of a plurality of power amplifiers 320-1, ..., 320-$i$ within a sector 330.

Further, a computer program product comprising instructions for performing at least some of the method steps 701-713 may be used for implementing the previously described method in the first carrier controller 315-1, when the computer program product is run on a processing unit 840.

The computer program product mentioned above may be provided for instance in the form of a data carrier carrying computer program code for performing the method steps according to the present solution when being loaded into the processor unit 840. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded remotely, e.g. over an Internet or an intranet connection.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a first carrier controller, associated with a network node for distributed power management of a plurality of power amplifiers within a sector, the first carrier controller, the network node and the power amplifiers are comprised within a communication system together with at least one further carrier controller, the first carrier controller being arranged for scheduling power allocation at each power amplifier of the radio frequency power estimated to be used by at least one carrier controlled by the first carrier controller, the method comprising:
   (1) estimating the radio frequency power to be used by the at least one carrier controlled by the first carrier controller during a predetermined time frame on one or more power amplifiers within the same sector;
   (2) distributing the estimated radio frequency power to the further carrier controller;
   (3) obtaining the estimated radio frequency power to be used by the at least one carrier controlled by the further carrier controller during the predetermined time frame;
   (4) based on (1) and (3), performing an allocation of radio frequency power to the one or more power amplifiers with the same sector;
   (5) if a maximum power threshold is exceeded for any of the one or more power amplifiers, performing a reallocation of the radio frequency power based on priority of the at least one carrier.

2. The method according to claim 1, wherein each carrier controller is associated with any radio technology out of the group:
   Global System for Mobile communications "GSM",
   Wideband Code Division Multiple Access "WCDMA",
   Long Time Evolution "LTE".

3. The method according to claim 1, wherein the predetermined time frame is between 0.5 ms and 6 ms.

4. A method in a first carrier controller, associated with a network node for distributed power management of a plurality of power amplifiers within a sector, the first carrier controller, the network node and the power amplifiers are comprised within a communication system together with at least one further carrier controller, the first carrier controller being arranged for scheduling power allocation at each power amplifier of the radio frequency power estimated to be used by at least one carrier controlled by the first carrier controller, the method comprising:
- estimating the radio frequency power to be used by the at least one carrier controlled by the first carrier controller during a predetermined time frame on one or more power amplifiers within the same sector,
- distributing the estimated radio frequency power to the further carrier controller,
- obtaining the estimated radio frequency power to be used by the at least one carrier controlled by the further carrier controller during the predetermined time frame,
- summing the estimated power usage of all the carriers controlled by the carrier controllers, for each partial period of time within the predetermined time frame,
- comparing the summed estimated power usage for each partial period of time with a maximum power limit threshold value of the power amplifier,
- distributing a priority value of the at least one carrier controlled by the first carrier controller, to the further carrier controller,
- obtaining a priority value of the at least one carrier controlled by each further carrier controller,
- decreasing the estimated power usage for the at least one carrier controlled by the first carrier controller or the at least one carrier comprised within the further carrier controller with the lowest priority value,
- repeating the acts of summing the estimated power usage, comparing the summed estimated power usage with the maximum power limit threshold value and decreasing the estimated power usage for the at least one carrier with the lowest priority value controlled by any carrier controller, until the remaining summed estimated power usage is equal to or lower than the maximum power limit threshold value;
- allocating the estimated power usage to be used by the at least one carrier controlled by the first carrier controller during the predetermined time frame.

5. The method according to claim 4, wherein, the act of comparing the summed estimated power usage for each partial period of time with a maximum power limit threshold value of the power amplifier, comprises comparing the summed estimated power usage of all the carriers controlled by the carrier controllers having a dedication to either a sector or to a preferred power amplifier within that sector, for each partial period of time, with a maximum power limit threshold value of each power amplifier within that sector.

6. The method according to claim 4, wherein,
if the maximum power limit threshold value of a certain power amplifier within the sector is exceeded by the summed estimated power usage for a certain partial period of time, the method comprises the further act of:
- changing the allocation to the preferred power amplifier of the at least one carrier with the lowest priority, with an allocation to another power amplifier within the same sector.

7. The method according to claim 4, wherein the communication system further comprises a distributed data base, and wherein the acts of distributing the estimated radio frequency power, distributing a priority value or distributing a reference to a preferred power amplifier comprises updating the distributed data base and wherein the acts of obtaining the estimated radio frequency power to be used by the at least one carrier controlled by the further carrier controller, obtaining a priority value of the at least one carrier controlled by each further carrier controller or obtaining a reference to a preferred power amplifier comprises obtaining said respective parameter from the distributed data base.

8. A method in a first carrier controller, associated with a network node for distributed power management of a plurality of power amplifiers within a sector, the first carrier controller, the network node and the power amplifiers are comprised within a communication system together with at least one further carrier controller, the first carrier controller being arranged for scheduling power allocation at each power amplifier of the radio frequency power estimated to be used by at least one carrier controlled by the first carrier controller, the method comprising:
- allocating estimated power usage to be used by the at least one carrier controlled by the first carrier controller during a predetermined time frame on one or more power amplifiers within the same sector, based on a priority value of each carrier, dedicated either to that sector or to a power amplifier within that sector;
- distributing a power allocation to a sector or to a preferred power amplifier within that sector to be used by the at least one carrier controlled by the first carrier controller, to the further carrier controller,
- obtaining a power allocation to a sector or to a preferred power amplifier within that sector to be used by the at least one carrier controlled by the further carrier controller.

9. A method in a first carrier controller, associated with a network node for distributed power management of a plurality of power amplifiers within a sector, the first carrier controller, the network node and the power amplifiers are comprised within a communication system together with at least one further carrier controller, the first carrier controller being arranged for scheduling power allocation at each power amplifier of the radio frequency power estimated to be used by at least one carrier controlled by the first carrier controller, the method comprising:
- allocating estimated power usage to be used by the at least one carrier controlled by the first carrier controller during a predetermined time frame on one or more power amplifiers within the same sector, based on a priority value of each carrier, dedicated either to that sector or to a power amplifier within that sector;
- wherein the act of allocating the estimated power usage to be used by the at least one carrier controlled by the first carrier controller during the predetermined time frame on the one or more power amplifiers within the same sector, based on the priority value of each carrier, dedicated either to that sector or to the power amplifier within that sector, comprises distributing the estimated power usage to the further carrier controller.

10. A method in a first carrier controller, associated with a network node for distributed power management of a plurality of power amplifiers within a sector, the first carrier controller, the network node and the power amplifiers are comprised within a communication system together with at least one further carrier controller, the first carrier controller being arranged for scheduling power allocation at each power amplifier of the radio frequency power estimated to be used by at least one carrier controlled by the first carrier controller, the method comprising:

allocating estimated power usage to be used by the at least one carrier controlled by the first carrier controller during a predetermined time frame on one or more power amplifiers within the same sector, based on a priority value of each carrier, dedicated either to that sector or to a power amplifier within that sector;

wherein the act of allocating the estimated power usage to be used by the at least one carrier controlled by the first carrier controller during the predetermined time frame on the one or more power amplifiers within the same sector, comprises allocating the carrier with the highest priority to the power amplifier within the sector, that have the biggest available capacity at the moment, until the maximum power limit threshold value of the power amplifier is exceeded, then the allocated power for that particular carrier is reduced until the maximum power limit threshold value of the power amplifier is not exceeded.

11. An arrangement in a first carrier controller, associated with a network node for distributed power management of a plurality of power amplifiers within a sector, the first carrier controller, the network node, the power amplifiers and the sectors are comprised within a communication system together with at least one further carrier controller, the first carrier controller being arranged for scheduling power allocation at the power amplifiers of the radio frequency power estimated to be used by at least one carrier controlled by the first carrier controller, the arrangement comprising:

an estimating unit configured to estimate the radio frequency power to be used by the at least one carrier controlled by the first carrier controller during a predetermined time frame on one or more power amplifiers within the same sector;

a distribution unit configured to distribute the estimated radio frequency power to the further carrier controller;

an obtaining unit configured to obtain estimated radio frequency power to be used by the at least one carrier controlled by the further carrier controller during the predetermined time frame;

an allocation unit configured:
to perform an allocation of radio frequency power to the one or more power amplifiers with the same sector based on the estimate of the estimating unit and the estimated radio frequency power obtained by the obtaining unit;
to perform a reallocation of the radio frequency power based on priority of the at least one carrier if a maximum power threshold is exceeded for any of the one or more power amplifiers.

* * * * *

UNITED STATES PATENT AND TRADEMARK OFFICE
CERTIFICATE OF CORRECTION

| | | |
|---|---|---|
| PATENT NO. | : 8,731,497 B2 | Page 1 of 1 |
| APPLICATION NO. | : 13/145345 | |
| DATED | : May 20, 2014 | |
| INVENTOR(S) | : Backman et al. | |

It is certified that error appears in the above-identified patent and that said Letters Patent is hereby corrected as shown below:

In The Specification

In Column 4, Line 16, delete "WCMDA" and insert -- WCDMA --, therefor.

In Column 4, Line 30, delete "319-1, 319-n" and insert -- 319-1, …, 319-n --, therefor.

In Column 4, Line 50, delete "315-30 nm" and insert -- 315- nm --, therefor.

In Column 6, Line 34, delete "4.6 ms," and insert -- 4,6 ms, --, therefor.

In Column 12, Lines 30-31, delete "315-2,315-m," and insert -- 315-2, …, 315-m, --, therefor.

Signed and Sealed this
Third Day of February, 2015

Michelle K. Lee
*Deputy Director of the United States Patent and Trademark Office*